Jan. 23, 1945.   F. W. CUTLER   2,367,757
FRUIT FEEDING DEVICE
Original Filed July 22, 1940   2 Sheets-Sheet 1
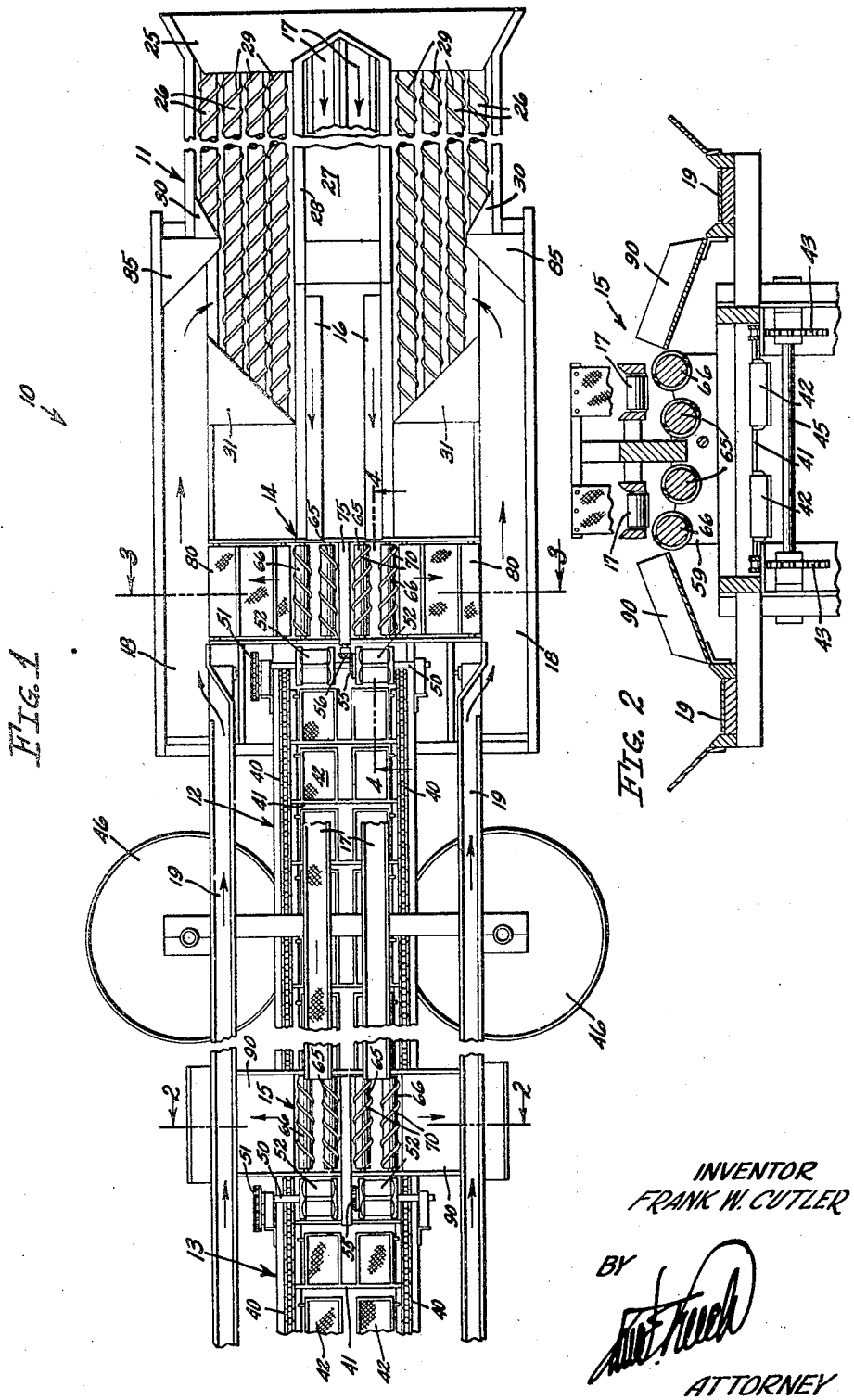
INVENTOR
FRANK W. CUTLER
BY
ATTORNEY Jan. 23, 1945.   F. W. CUTLER   2,367,757
FRUIT FEEDING DEVICE
Original Filed July 22, 1940   2 Sheets-Sheet 2
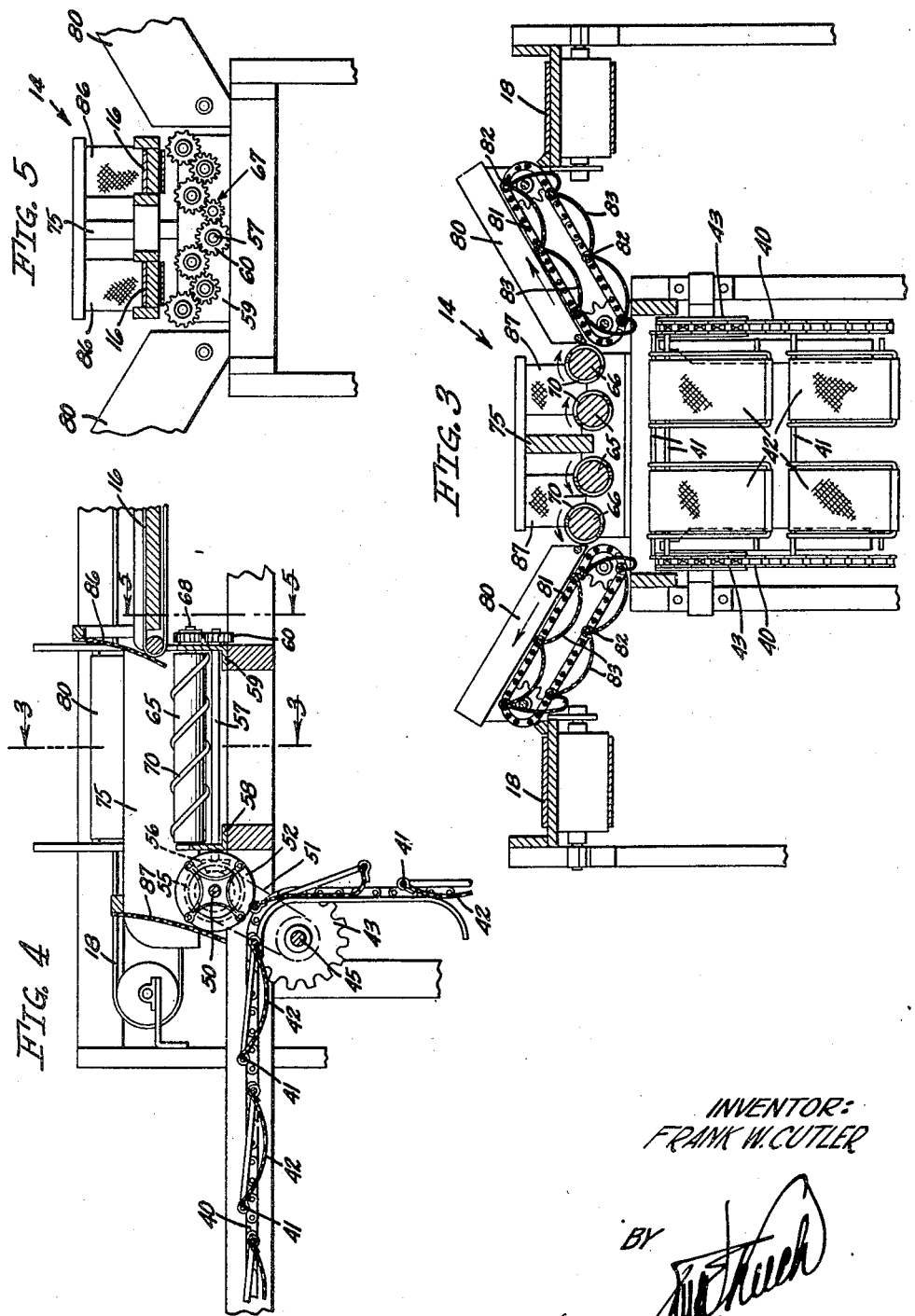
INVENTOR:
FRANK W. CUTLER
BY
ATTORNEY Patented Jan. 23, 1945

2,367,757

UNITED STATES PATENT OFFICE 2,367,757

FRUIT FEEDING DEVICE

Frank W. Cutler, Palm Springs, Calif., assignor to Food Machinery Corporation, San Jose, Calif., a corporation of Delaware Original application July 22, 1940, Serial No. 346,724, now Patent No. 2,313,051, dated March 9, 1943. Divided and this application January 2, 1943, Serial No. 471,105

1 Claim. (Cl. 198—30)

This invention relates to the feeding of rollable articles and particularly to the feeding of such articles in single file at a predetermined uniform rate. As this invention is particularly useful in the feeding of fruit from a grader to a sizing machine, it will be disclosed as employed in this connection in the present application.

The sizer which has come into most general use for sizing apples is the Cutler sizer which operates on the weight principle. This sizer weighs each individual piece of fruit, it being necessary to feed the fruit individually to a series of weighing pockets traveling along with a conveyor. For the sizer to operate properly, only one piece of fruit may be fed to each of these pockets. Before the fruit is fed to one of these sizers, it is customary to grade the fruit by hand on a grading table from which the fruit is fed along conveyor belts to the sizer. It is extremely difficult to feed just the right amount of fruit along these conveyor belts traveling between the grading table and the sizer so that an excess amount of fruit will not arrive at the sizer causing more than one piece of fruit at a time to be deposited occasionally in one of the size pockets.

It is an object of the present invention to provide a fruit feeding device by which fruit may be conveyed from a grading table to a single file weight sizer in such a manner as to eliminate two pieces of fruit being fed to one of the sizer pockets at a time.

It is a further object of this invention to provide a fruit feeding device by which rollable pieces of fruit may be fed individually at uniform intervals and in uniform spaced relation along a given line to a piece of apparatus adapted to receive the same when so fed and where said fruit is delivered to said device in excess of the amount rquired for such feeding.

This application is a division carved out of my copending application for U. S. Letters Patent, Serial Number 346,724, filed July 22, 1940 and issued March 9, 1943, as Patent No. 2,313,051, for Fruit handling equipment.

The manner of accomplishing the foregoing objects, as well as further objects and advantages, will be made manifest in the following description taken in connection with the accompaning drawings, in which:

Fig. 1 is a fragmentary plan view of an assembled fruit grading and sizing apparatus incorporating a preferred embodiment of the invention.

Fig. 2 is an enlarged cross-sectional view taken on the line 2—2 of Fig. 1 and illustrating one of the feeding devices of the present invention.

Fig. 3 is an enlarged cross-sectional view taken on the line 3—3 of Fig. 1 and illustrates another of the feeding devices of the invention.

Fig. 4 is a longitudinal sectional view taken on the line 4—4 of Fig. 1 and illustrates details of construction of the feeding device shown in Fig. 3.

Fig. 5 is a detailed transverse sectional view taken on the line 5—5 of Fig. 4 and illustrates the mechanism for driving the feeding device shown in Figs. 3 and 4.

Referring specifically to the drawings, the grading and sizing apparatus 10 shown therein includes a grading unit 11, sizing units 12 and 13, feeder units 14 and 15 for feeding fruit to said sizer units, conveyor belts 16 and 17 for feeding fruit from said grader unit to said sizer units, and return belts 18 and 19 for returning excess fruit from said feeders 14 and 15 to said grader unit 11.

The grader unit 11

The grader unit 11 includes a delivery board or hopper 25 and a series of fruit supporting conveyor rollers 26 which are disposed on opposite sides of a well 27 which is surrounded by a wall 28, this well being provided to receive cull fruit sorted from that carried on the rollers 26.

The rollers 26 are rotated so that their upper faces move toward the center of the grader unit 11, thus causing threads 29, formed by wrapping rope about the rollers 26, to feed fruit in a leftward direction along these rollers. Sweep-up boards 30 and 31 sweep this fruit inwardly from over the rollers 26 and onto the conveyor belts 16 which deliver the fruit in single files to the fruit feeder unit 14. In Fig. 1, the belts 17 are broken away but these comprise part of the grader unit 11 and extend centrally and longitudinally over this unit within reach of the workers grading the fruit. In the grading operation, merchantable fruit of a certain quality is segregated out from that carried on the rollers 26 and placed on the belts 17 to be sized by the sizer section 13.

The sizer sections 12 and 13

These sizer sections are of the type well known in the art as the Cutler sizer which is almost universally used in the northwest area for sizing apples and which is adequately illustrated in my U. S. Letters Patent No. 1,184,697, issued May 23, 1916; No. 1,633,002, issued June 21, 1927; and 1,860,732, issued May 31, 1932.

The units 12 and 13 are identical. Each of them has a pair of endless conveyor chains 40 which are connected by rods 41 on each of which is pivotally mounted a pair of pockets 42, thus forming two traveling rows of these pockets while the device is in operation. The chains 40 are trained about a series of sprockets, one pair of which is mounted on a shaft 45. The pockets 42 are adapted to receive fruit as the chains 40 travel about the shaft 45. Each pocket receives a single piece of fruit and, as it travels along the pathway traversed by the upper flights of the chains 40, sizes this fruit in the manner well known in the art.

Provided along each sizer section 12 and 13 is a series of rotary bins 46, the construction and operation of which is well known in the art, these bins receiving fruit in accordance with the sizes into which it is segregated by the sizer units 12 and 13.

The fruit feeding devices 14 and 15

These devices are alike with the exceptions to be noted hereinafter. Each includes a shaft 50 which is driven as by a chain and sprocket connection 51 with the shaft 45 and has mounted thereon star wheels 52 which are in alignment with the respective rows of pockets 42 of the adjacent sizer section. Each of the star wheels 52 preferably has four pockets and the chain and sprocket connection 51 rotates the shaft 50 so that each of the pockets 42 in the adjacent sizer section is adapted to receive a piece of fruit from one of the star wheel pockets as the sizer pockets pass thereunder.

The shaft 50 carries a miter gear 55 which meshes with a miter gear 56 provided on a shaft 57. The shaft 57 is journalled in a pair of angle irons 58 and 59 provided on the frame of the apparatus 10 and has a gear 60 provided on its rear end. Also extending between and journalled in suitable bearings provided upon the angle irons 58 and 59 are two inner rollers 65 and two outer rollers 66. A system of gears 67 provided on rear extending ends of shafts 68 of these rollers mesh with and are driven by the gear wheel 60 so that the rollers 65 and 66 are driven to cause their upper surfaces to travel outwardly.

The outer rollers 66 are disposed slightly above the inner rollers 65, and all of these rollers are provided with rope threads 70 which are produced by strands of rope coiled about the rollers, the pitch of these threads on these rollers being such that a series of traveling pocket-like spaces are created in the valleys between the rollers of each of these respective pairs which travel from the delivery end of the belt 16 to the star wheels 52 located at the discharge end of these valleys.

The inner rollers 65 are separated by a septum board 75 to prevent fruit from falling inwardly from the valleys between the pairs of rollers 65 and 66. The discharge ends of the belts 16 in the fruit feeding device 14 and the belts 17 in the fruit feeding device 15 are disposed just over the receiving ends of the valleys between the rollers 65 and 66.

Disposed adjacent to, outwardly from and coextensive with each of the outer rollers 66 in the fruit feeder 14 is a discarded-fruit elevator 80, these being properly driven during the operation of the apparatus 10 to receive any fruit passing over the outermost rollers 66 to elevate and discharge this fruit onto one of the belts 18. The elevators 80 may be of any preferred type but are shown as comprising a pair of endless chains 81 carrying rods 82 which support an endless belt of canvas 83 so that this sags somewhat between the rods 82 in the upper flight of the conveyor to receive and elevate fruit disposed on this canvas and deliver the same onto return belts 18.

These return belts travel toward the fruit grading unit 11, the fruit being swept off of the discharge belts 18 onto the rollers 26 by sweep-off boards 85.

In order to cause a gentle transfer of the fruit handled in the fruit delivery device 14, drapes 86 and 87 are provided at the discharge ends of the belts 16 and star wheels 52 as shown in Fig. 4, so that the fall of fruit being delivered at these points is broken.

The fruit feeding device 15 as shown in Figs. 1 and 2 is identical with the fruit feeding device 14, except that it is not equipped with elevators 80. In place of the elevators 80, the fruit feeding device 15 has inclined chutes 90 for delivering fruit discarded from the outermost rollers 66 onto the return belts 19, the latter being disposed at a lower level than these rollers. The return belts 19 travel rearwardly and deliver discarded fruit onto the receiving ends of the belts 18 so that this fruit is conveyed by the latter belts until it is swept therefrom by sweep-off boards 85 onto the spiral rollers 26.

Operation

The operation of the apparatus 10 is believed to be clear from the foregoing description, but will be briefly outlined as follows:

All the moving elements of the apparatus are first set in motion as above described. Fruit is then dumped as from boxes onto the dropboard 25 from which it rolls down onto the spiral rollers 26, these conveying the fruit longitudinally thereof beneath the eyes of a series of workers placed along the grader unit 11, whose function is to examine the fruit as it passes by, select culls therefrom, throwing these into the well 27, and pick the less numerous of two merchantable grades of fruit from the rollers 26, placing this fruit on the belts 17. The rest of the fruit is allowed to continue on the rollers 26 until swept off by the sweep boards 31 onto the belts 16, which deliver this fruit in single file into the valleys between the rollers 65 and 66 of the feeder device 14.

In order that the sizer sections 12 and 13 may operate at full capacity, it is desirable that each of the pockets 42 receives a piece of fruit as it passes by its respective star wheel 52. To accomplish this, it is necessary to feed an excess of fruit along the conveyors 16 and 17 to the feed device 14 and 15. The rotation of the rollers 65 and 66 has the effect of locating one piece of fruit in each of the traveling pockets formed between the spiral threads 70 as these pockets travel along toward the adjacent star wheel 52 of this device, but if there is any surplus of this fruit other than that necessary to fill each of these pockets, the action of the rollers, rotating both outwardly as they do, is to expel the excess pieces of fruit onto the adjacent conveyor 80 which delivers it to a return belt carrying the fruit back to the grader. Thus, no matter how much fruit is delivered by the belts 16 t the feeding device 14, two pieces of fruit are never delivered by this feed device to a single one of the pockets 42 of the sizer section 12. There is thus no misfunctioning of the sizer as takes place when two pieces of fruit are delivered to one pocket. Furthermore, each of these pockets always receives a piece of fruit, provided an adequate supply of fruit is fed to the rollers 65 and 66.

In the same way, the feeding device 15 feeds fruit to the sizer section 13 so as to provide each of the sizing pockets 42 in the upper flight thereof with a piece of fruit and yet prevent the delivery of two pieces of fruit to any one of these pockets. Any excess of pieces of fruit which may be delivered by the conveyors 17 to the rollers 65 and 66 of the feed device 15 are discarded outwardly into the chutes 90 and returned by belts 19 and 18 to the grader 11.

What I claim is:

A fruit feeding device comprising: a pair of feed rollers arranged in side by side relation to form a fruit-supporting valley therebetween, said valley having an open end from which fruit may be discharged endwise from the rollers, said rollers being provided with helical threads pitched in a common direction and arranged in cooperative relation to form a series of fruit receiving pockets between the rollers for the reception of individual pieces of fruit, one of said rollers being positioned with its upper surface above the upper surface of the other; means for rotating the rollers in a common direction such as to cause the upper surface of the lower roller to travel toward the higher roller and to cause said pockets to travel longitudinally of the rollers to advance the pieces of fruit in said pockets along said valley toward its discharge end, and a guide disposed adjacent the lower roller to prevent lateral overflow to that side of the rollers of pieces of fruit in excess of those in the pockets whereby said excess pieces of fruit are forced from the rollers across the higher roller while the pieces of fruit conveyed in the pockets are free to be discharged endwise from the valley between said rollers.

FRANK W. CUTLER.